(12) United States Patent
De

(10) Patent No.: US 10,544,791 B2
(45) Date of Patent: Jan. 28, 2020

(54) CENTRIFUGAL COMPRESSOR STARTUP CONTROL

(71) Applicant: Carrier Corporation, Farmington, CT (US)

(72) Inventor: Tathagata De, Charlotte, NC (US)

(73) Assignee: Carrier Corporation, Palm Beach Gardens, FL (US)

(*) Notice: Subject to any disclaimer, the term of this patent is extended or adjusted under 35 U.S.C. 154(b) by 1556 days.

(21) Appl. No.: 14/352,164

(22) PCT Filed: Nov. 15, 2012

(86) PCT No.: PCT/US2012/065194
§ 371 (c)(1),
(2) Date: Apr. 16, 2014

(87) PCT Pub. No.: WO2013/081840
PCT Pub. Date: Jun. 6, 2013

(65) Prior Publication Data
US 2015/0219110 A1    Aug. 6, 2015

Related U.S. Application Data

(60) Provisional application No. 61/565,702, filed on Dec. 1, 2011.

(51) Int. Cl.
*F04D 27/00* (2006.01)
*F04D 17/10* (2006.01)
(Continued)

(52) U.S. Cl.
CPC ........... *F04D 27/002* (2013.01); *F04D 17/10* (2013.01); *F04D 27/001* (2013.01);
(Continued)

(58) Field of Classification Search
CPC ............... F04D 27/002; F04D 27/0246; F04D 27/0261; F04D 27/0292; F05D 2250/51; F05D 2260/85
(Continued)

(56) References Cited

U.S. PATENT DOCUMENTS 3,362,625 A * 1/1968 Endress .............. F04D 27/0246
 415/149.1
3,973,391 A    8/1976 Reed et al.
(Continued)

FOREIGN PATENT DOCUMENTS

CN    1650105 A    8/2005
CN    1826499 A    8/2006
(Continued)

OTHER PUBLICATIONS

Chinese Office Action for Chinese Patent Application No. 201280059349.1, dated Jan. 14, 2016.
(Continued)

*Primary Examiner* — Kun Kai Ma
(74) *Attorney, Agent, or Firm* — Bachman & LaPointe, P.C.

(57) ABSTRACT

There is a method for controlling a centrifugal compressor (22) having an inlet (24), an outlet (26), an impeller (54) mounted for rotation about an impeller axis (502), a motor (52) coupled to the impeller to drive the impeller about the impeller axis (502), and a variable inlet guide vane (56) array (55) controllable for movement between a relatively closed first condition and a relatively open second condition. A lift value is determined (304). An allowable guide vane condition based upon the lift value is determined (306). The guide vane array is closed (308) to the determined allowable guide vane condition. The impeller is accelerated (312) to an operational speed.

20 Claims, 11 Drawing Sheets

(51) Int. Cl.
*F04D 27/02* (2006.01)
*F25B 1/053* (2006.01)
*F04D 17/00* (2006.01)

(52) U.S. Cl.
CPC ..... *F04D 27/0246* (2013.01); *F04D 27/0261* (2013.01); *F04D 27/0292* (2013.01); *F25B 1/053* (2013.01); F05D 2250/51 (2013.01); F05D 2260/85 (2013.01); F25B 2500/26 (2013.01)

(58) Field of Classification Search
USPC .......................................... 415/1, 13, 17, 48
See application file for complete search history.

(56) References Cited

U.S. PATENT DOCUMENTS

| | | | | |
|---|---|---|---|---|
| 4,151,725 A * | 5/1979 | Kountz | ............... | F04D 27/0246 62/182 |
| 4,282,719 A | 8/1981 | Kountz et al. | | |
| 4,460,310 A * | 7/1984 | Plunkett | ................ | F01D 17/143 415/158 |
| 4,503,684 A * | 3/1985 | Mount | ................ | F04D 27/0246 415/14 |
| 4,514,991 A * | 5/1985 | Zinsmeyer | ............ | F04D 25/024 475/2 |
| 4,608,833 A | 9/1986 | Kountz | | |
| 4,616,483 A * | 10/1986 | Leonard | ................ | F01D 17/143 415/47 |
| 4,686,834 A * | 8/1987 | Haley | ..................... | F04D 27/02 62/209 |
| 4,969,798 A * | 11/1990 | Sakai | .................. | F04D 27/0246 415/150 |
| 4,989,403 A | 2/1991 | Rodgers | | |
| 5,095,714 A * | 3/1992 | Adachi | ................ | F25B 49/022 415/48 |
| 5,306,116 A * | 4/1994 | Gunn | ....................... | F04D 27/02 415/17 |
| 5,368,440 A * | 11/1994 | Japikse | ................. | F04D 29/444 415/208.3 |
| 5,537,830 A | 7/1996 | Goshaw et al. | | |
| 5,618,160 A * | 4/1997 | Harada | ............... | F04D 27/0246 415/15 |
| 5,669,756 A * | 9/1997 | Brasz | .................. | F04D 27/0215 415/47 |
| 5,683,223 A * | 11/1997 | Harada | .................... | F04D 27/02 415/17 |
| 5,746,062 A | 5/1998 | Beaverson et al. | | |
| 5,807,071 A * | 9/1998 | Brasz | .................. | F04D 27/0253 415/148 |
| 5,873,696 A * | 2/1999 | Harada | ............... | F04D 27/0246 415/148 |
| 5,947,680 A * | 9/1999 | Harada | ............... | F04D 27/0284 415/17 |
| 6,012,897 A * | 1/2000 | Sabnis | .................... | F04D 27/02 415/119 |
| 6,036,432 A * | 3/2000 | Sishtla | ............... | F04D 27/0284 415/119 |
| 6,039,534 A * | 3/2000 | Stoner | ................... | F01D 17/162 415/150 |
| 6,129,511 A * | 10/2000 | Salvage | .................. | F01D 17/02 415/1 |
| 6,341,238 B1 | 1/2002 | Modeen et al. | | |
| 6,427,464 B1 * | 8/2002 | Beaverson | .......... | F04D 27/0207 62/129 |
| 6,506,011 B1 * | 1/2003 | Sishtla | .................. | F04D 29/462 415/1 |
| 6,581,399 B2 | 6/2003 | Benedict et al. | | |
| 6,789,000 B1 | 9/2004 | Munson, Jr. | | |
| 7,972,105 B2 | 7/2011 | Dejoris et al. | | |
| 8,079,808 B2 * | 12/2011 | Sconfietti | .............. | F04D 29/462 415/162 |
| 8,291,720 B2 * | 10/2012 | Hartman | ............. | F04D 27/0261 62/228.5 |
| 9,388,815 B2 * | 7/2016 | Chen | ........................ | F04D 17/10 |
| 2004/0221592 A1 | 11/2004 | Knopp | | |
| 2005/0160748 A1 | 7/2005 | Shaffer et al. | | |
| 2005/0265819 A1 | 12/2005 | Kotani et al. | | |
| 2007/0214787 A1 * | 9/2007 | Noelle | .................... | F02B 37/24 60/602 |
| 2008/0253877 A1 * | 10/2008 | Bodell | ................ | F04D 27/0207 415/13 |
| 2009/0097962 A1 | 4/2009 | Williams | | |
| 2010/0263391 A1 * | 10/2010 | Tetu | ..................... | F04D 27/0253 62/89 |
| 2011/0048046 A1 * | 3/2011 | Sommer | .................. | F04D 17/12 62/228.1 |
| 2011/0056210 A1 | 3/2011 | Griffin et al. | | |
| 2011/0182715 A1 | 7/2011 | Leithead et al. | | |
| 2012/0219431 A1 * | 8/2012 | Sishtla | ................ | F04D 27/0246 417/53 |
| 2014/0260388 A1 * | 9/2014 | Umeda | .................. | F25B 49/022 62/208 |

FOREIGN PATENT DOCUMENTS

| | | |
|---|---|---|
| CN | 101896773 A | 11/2010 |
| GB | 1593361 A | 7/1981 |
| WO | 2011049891 A1 | 4/2011 |
| WO | WO 2011049891 A1 * | 4/2011 ......... F04D 27/0246 |

OTHER PUBLICATIONS

Chinese Office Action for Chinese Patent Application No. 201280059349.1, dated Jun. 26, 2015.
International Search Report and Written Opinion for PCT/US2012/065194, dated Feb. 7, 2013.

* cited by examiner

CENTRIFUGAL COMPRESSOR STARTUP CONTROL

CROSS-REFERENCE TO RELATED APPLICATION

Benefit is claimed of U.S. Patent Application Ser. No. 61/565,702, filed Dec. 1, 2011, and entitled "Centrifugal Compressor Startup Control", the disclosure of which is incorporated by reference herein in its entirety as if set forth at length.

BACKGROUND

The disclosure relates to centrifugal compressors. More particularly, the disclosure relates to electric motor-driven centrifugal compressors having controllable inlet guide vane arrays.

One particular use of electric motor-driven centrifugal compressors is liquid chillers. An exemplary liquid cooled chiller uses a hermetic centrifugal compressor. The exemplary unit comprises a standalone combination of the compressor, the condenser unit, the cooler unit, the expansion device, and various additional components.

Some compressors include a transmission intervening between the motor rotor and the impeller to drive the impeller at a faster speed than the motor. In other compressors, the impeller is directly driven by the rotor (e.g., they are on the same shaft).

Centrifugal compressors have a limitation for operating at high head due to flow instability called "surge". The effect of surge is high vibrations and damage to the impeller and bearings. Hence, it is preferable to avoid surge in a compressor. At a given speed, a compressor has an associated maximum head limitation dictated by surge. For a compressor having inlet guide vanes for capacity control, at a constant suction pressure the discharge pressure at which surge occurs reduces with load. Surge may be triggered by something which increases saturation temperature at the condenser or decreases saturation temperature at the evaporator. For example, if condenser water temperature increases, surge may occur.

In operation, the controller controls vane condition (orientation) to throttle the inlet flow to maintain a required amount of refrigerant flow rate.

Surge can be an issue at compressor startup. Surge may be limited by closing the inlet guide vanes at startup. In one baseline system, the compressor is operating at a given condition when the system suddenly shuts down (e.g., upon power loss, thus leaving the guide vanes in their pre-shutdown condition). At startup, to prevent surge, the guide vanes are first fully closed prior to starting the motor.

SUMMARY

An aspect of the disclosure involves a method for controlling a centrifugal compressor having an inlet, an outlet, an impeller mounted for rotation about an impeller axis, a motor coupled to the impeller to drive the impeller about the impeller axis, and a variable inlet guide vane array controllable for movement between a relatively closed first condition and a relatively open second condition. A lift value is determined. An allowable guide vane condition based upon the lift value is determined. The guide vane array is closed to the determined allowable guide vane condition. The impeller is accelerated to an operational speed.

Another aspect of the disclosure involves a controller configured to implement the method.

Another aspect of the disclosure involves a chiller system including the controller, the compressor, a heat rejection heat exchanger downstream of the compressor along a refrigerant flowpath, and a heat absorption heat exchanger downstream of the heat rejection heat exchanger along the refrigerant flowpath.

In various embodiments, the acceleration may be from a dead stop.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
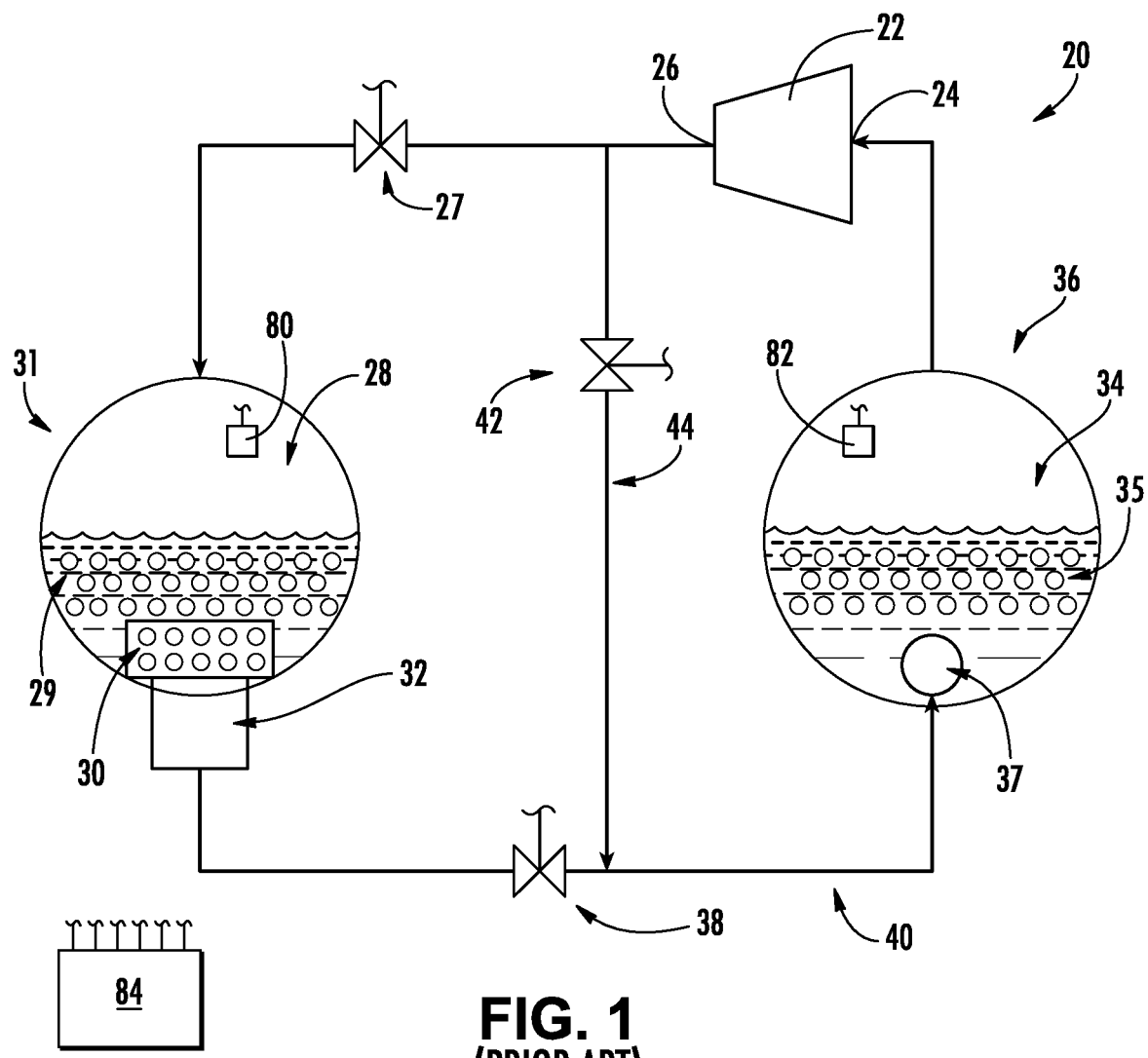
FIG. 1 is a schematic view of a chiller system.

FIG. 1 shows a vapor compression system 20. Except for control aspects discussed below, the system and its components may represent any of a wide number of prior art or yet developed hardware configurations. The exemplary vapor compression system 20 is a chiller system. The system 20 includes a centrifugal compressor 22 having a suction port (inlet) 24 and a discharge port (outlet) 26. The system further includes a first heat exchanger 28 in a normal operating mode being a heat rejection heat exchanger (e.g., a gas cooler or condenser). In an exemplary system based upon an existing chiller, the heat exchanger 28 is a refrigerant-water heat exchanger formed by tube bundles 29, 30 in a condenser unit 31 where the refrigerant is cooled by an external water flow. A float valve 32 controls flow through the condenser outlet from a subcooler chamber surrounding the subcooler bundle 30.

The system further includes a second heat exchanger 34 (in the normal mode a heat absorption heat exchanger or evaporator). In the exemplary system, the heat exchanger 34 is a refrigerant-water heat exchanger formed by a tube bundle 35 for chilling a chilled water flow within a chiller unit 36. The unit 36 includes a refrigerant distributor 37. An expansion device 38 is downstream of the compressor and upstream of the evaporator along the normal mode refrigerant flowpath 40 (the flowpath being partially surrounded by associated piping, etc.).

A hot gas bypass valve 42 is positioned along a bypass flowpath branch 44 extending between a first location downstream of the compressor outlet 26 and upstream of the isolation valve 27 and a second location upstream of the inlet of the cooler and downstream of the expansion device 38.

Figure 3:
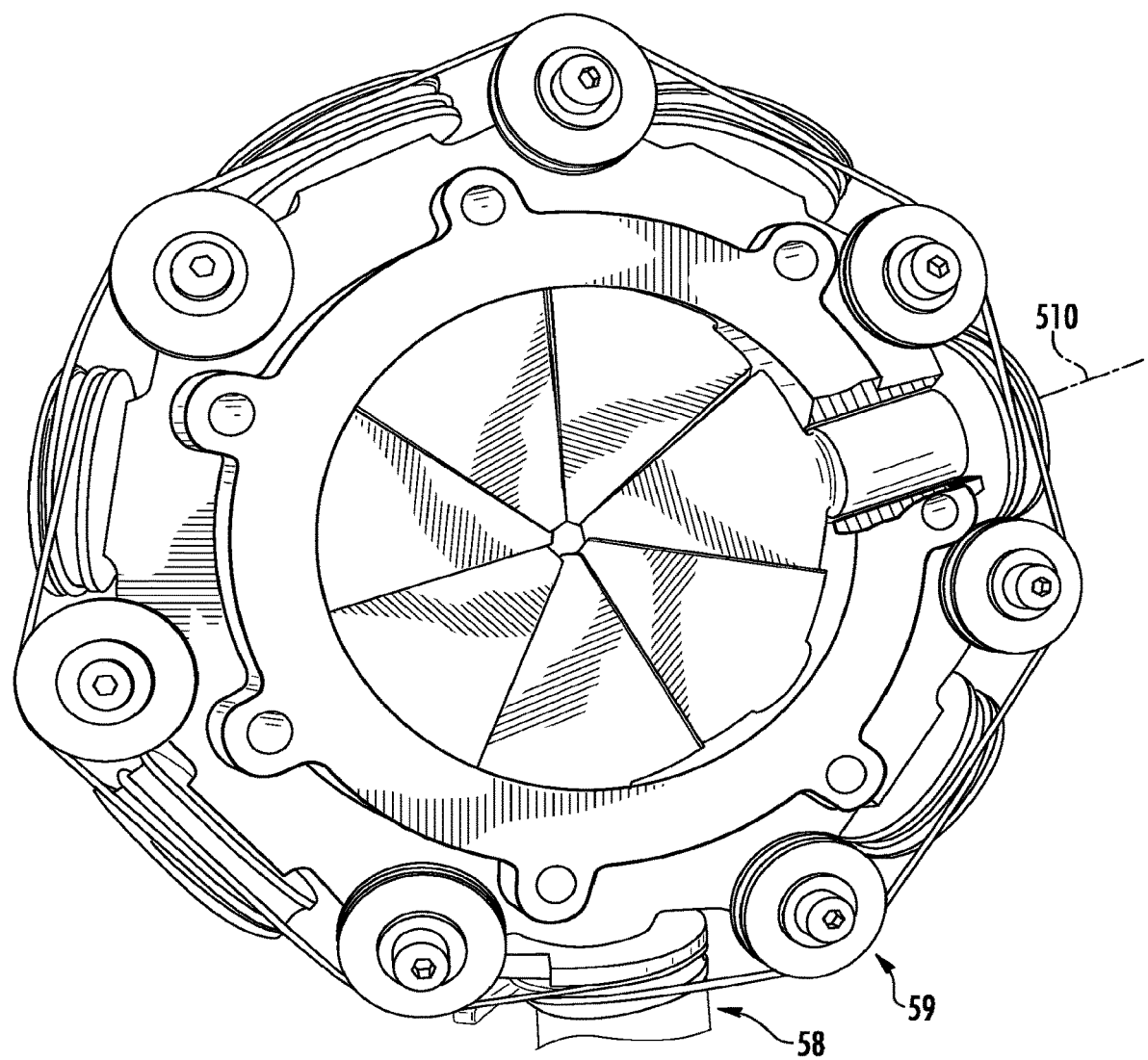
FIG. 3 is a cutaway view of the compressor showing the closed guide vanes interleaved.
Figure 4:
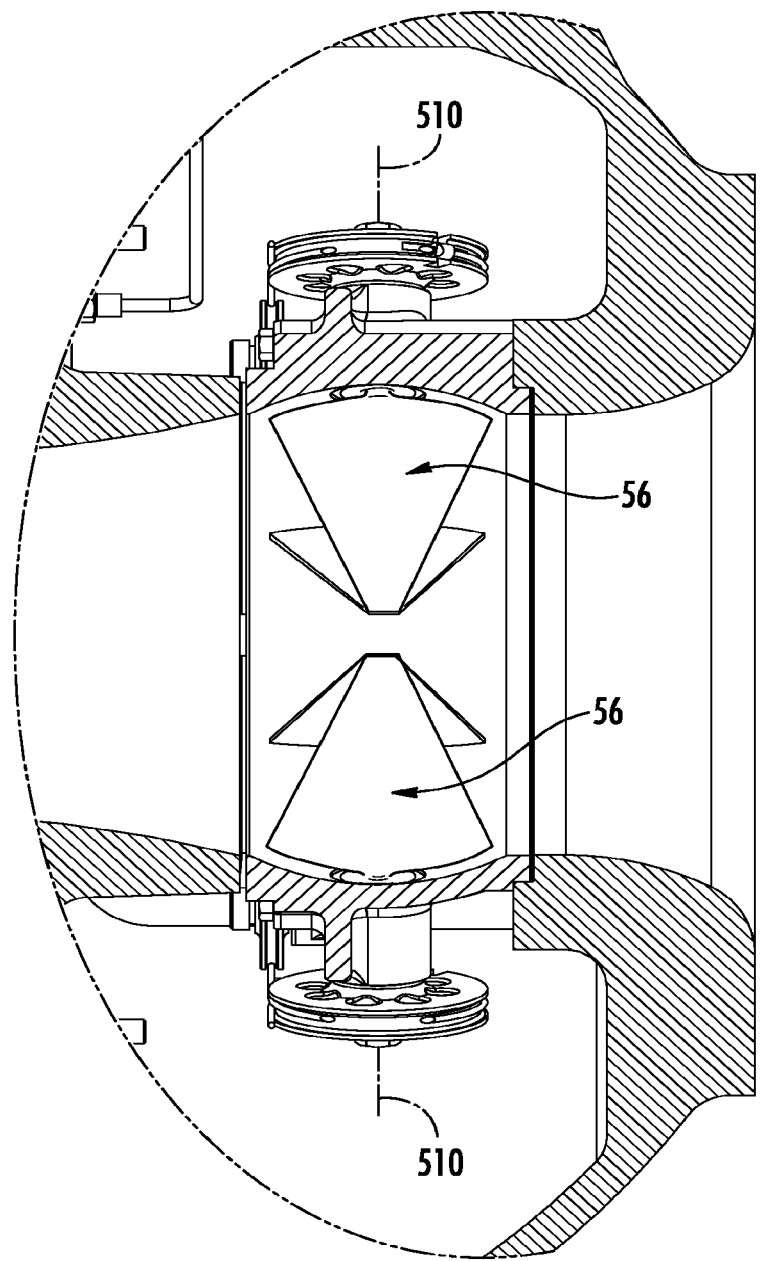
FIG. 4 is an enlarged axial sectional view of the compressor with guide vanes fully open.
Figure 5:
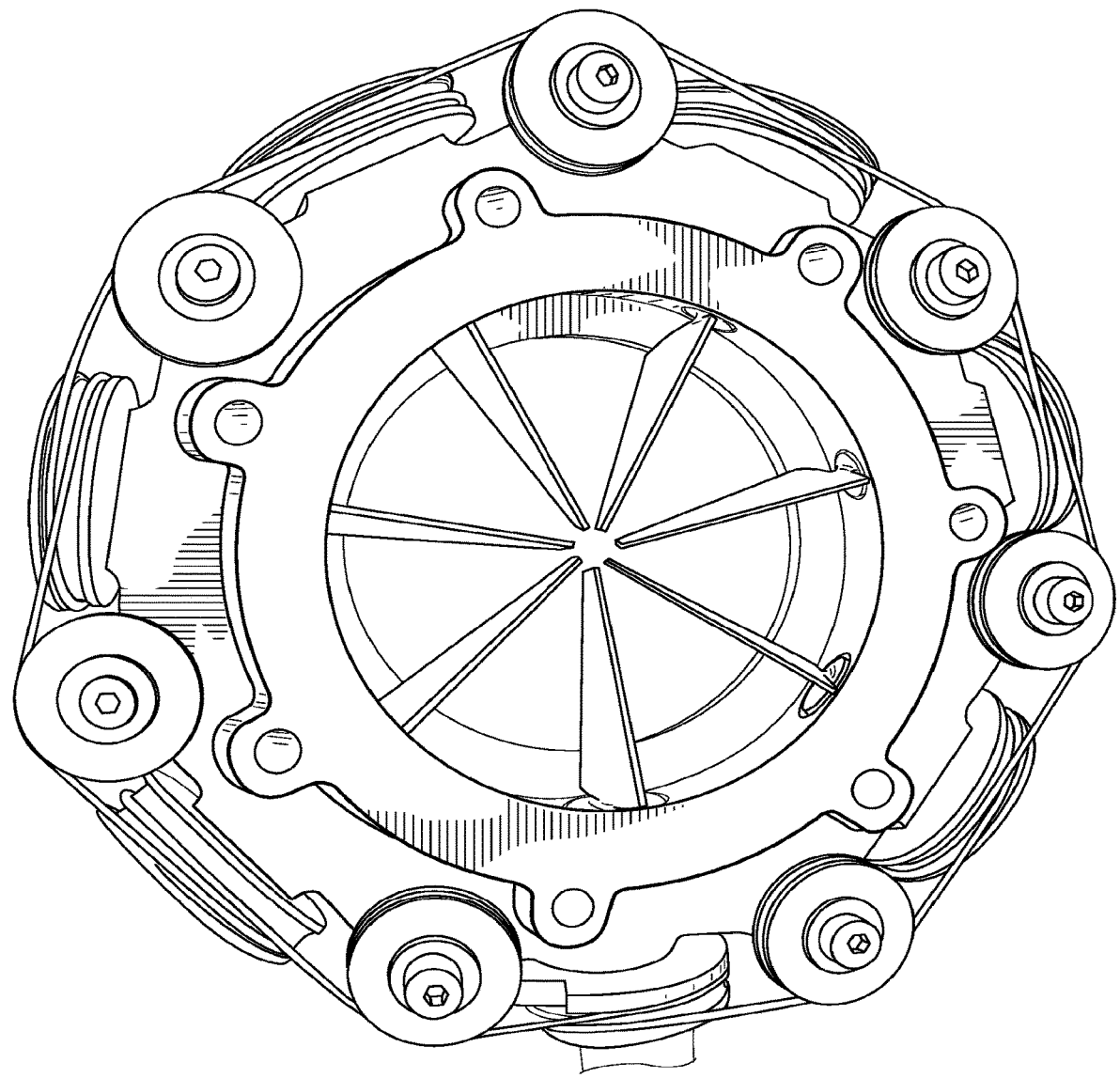
FIG. 5 is a cutaway view of the compressor showing the open guide vanes.
Figure 6:
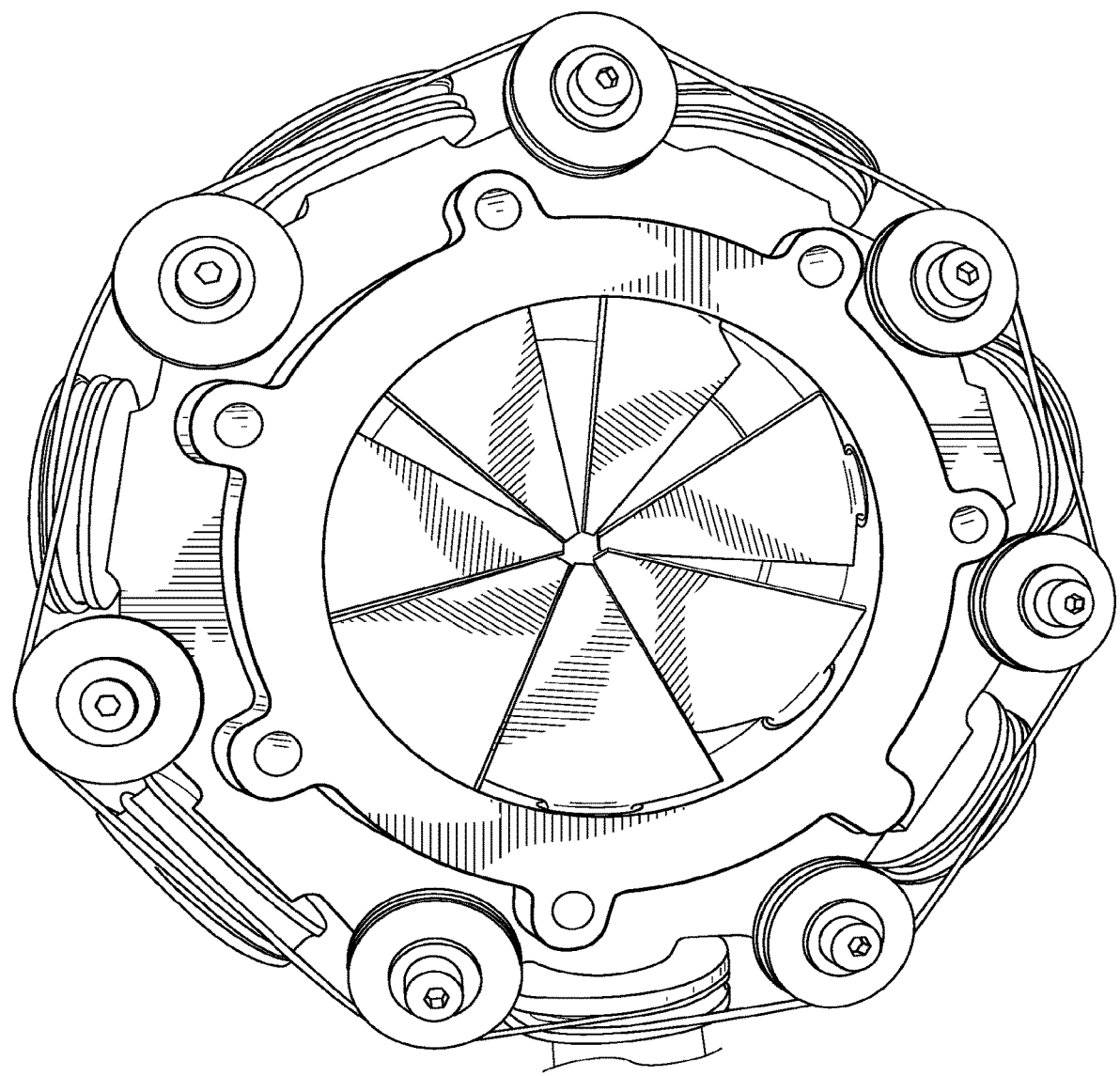
FIG. 6 is a cutaway view of the compressor showing the guide vanes in a first intermediate condition.
Figure 7:
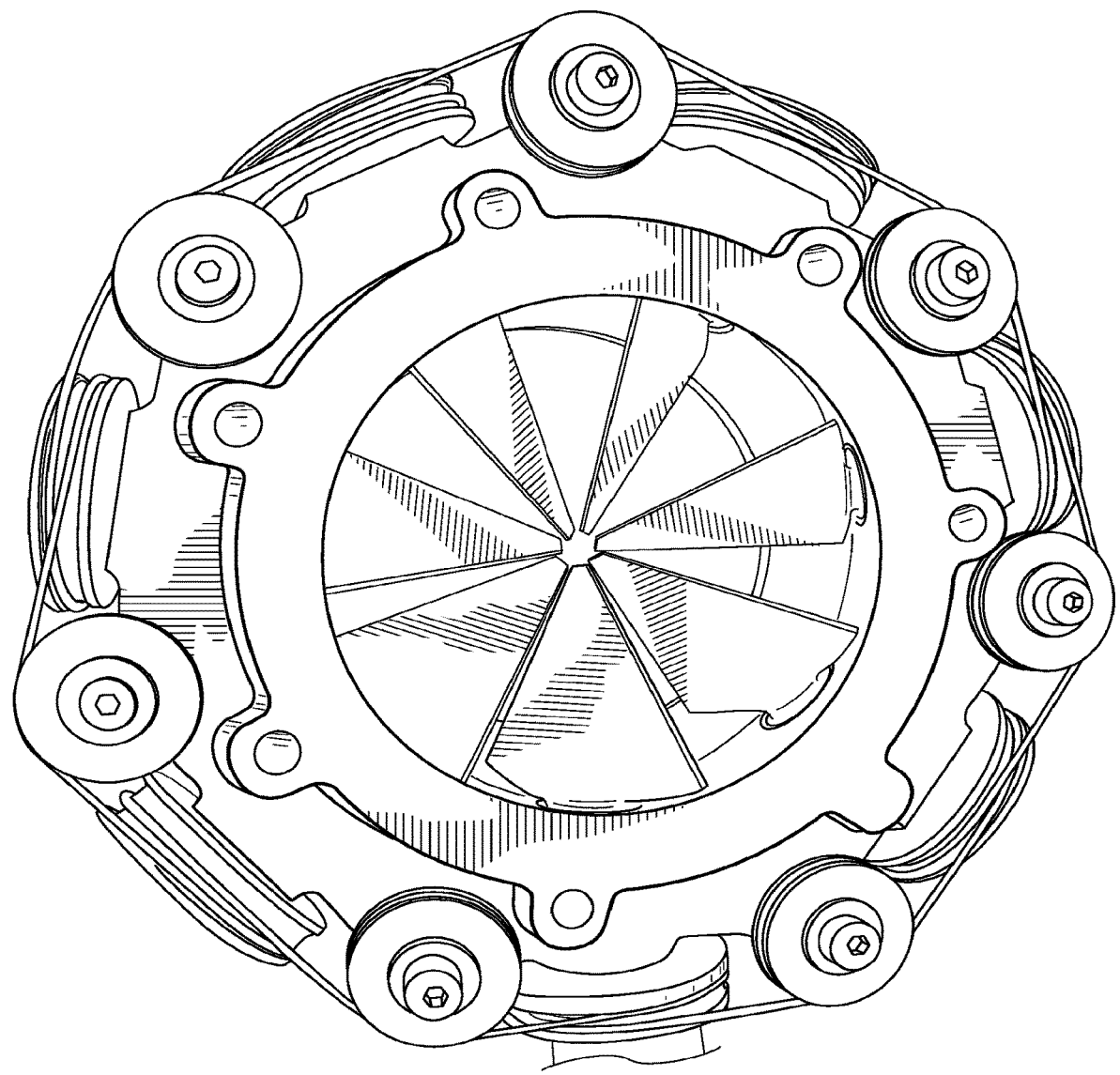
FIG. 7 is a cutaway view of the compressor showing the guide vanes in a second intermediate condition more open than the first intermediate condition.

The compressor (FIG. 2) has a housing assembly (housing) 50. The exemplary housing assembly contains an electric motor 52 and one or more impellers 54 drivable by the electric motor in the first mode to compress fluid (refrigerant) to draw fluid (refrigerant) in through the suction port 24, compress the fluid, and discharge the fluid from the discharge port 26. The exemplary impeller is directly driven by the motor (i.e., without an intervening transmission). Just downstream of the compressor inlet 24 is a circumferential array 55 of inlet guide vanes 56. Each of the vanes is generally triangular in plan form and is mounted for rotation about an associated vane axis 510 (FIG. 3). As is discussed further below, the vanes are rotatable in synchronization about their axes 510 between a maximally closed condition of FIGS. 2A and 3 and a maximally open condition of FIGS. 4 and 5. Two exemplary intermediate conditions are shown in FIGS. 6 and 7, respectively. Guide vane actuation may be via electrically control actuator 58 (e.g., a stepper motor shown schematically via its housing in FIG. 8). An exemplary synchronization mechanism 59 comprises a pulley area linking the vanes to each other.

The housing defines a motor compartment 60 containing a stator 62 of the motor within the compartment. A rotor 64 of the motor is partially within the stator and is mounted for rotation about a rotor axis 500. The exemplary mounting is via one or more mechanical and/or electromagnetic bearing systems mounting a shaft 70 of the rotor to the housing assembly. The exemplary impeller 54 is mounted to an impeller shaft 72 (e.g., to an end portion thereof) to rotate therewith as a unit about an impeller axis 502. A transmission 74 may couple the motor shaft to the impeller shaft to allow the motor to drive the impeller and may offset the axis 502 from the axis 500. In alternative implementations, the impeller is directly mounted to the motor shaft to rotate therewith as a unit about the axis 500. Again, one or more bearing systems may mount the impeller shaft for rotation about its axis 502.

Figure 2:
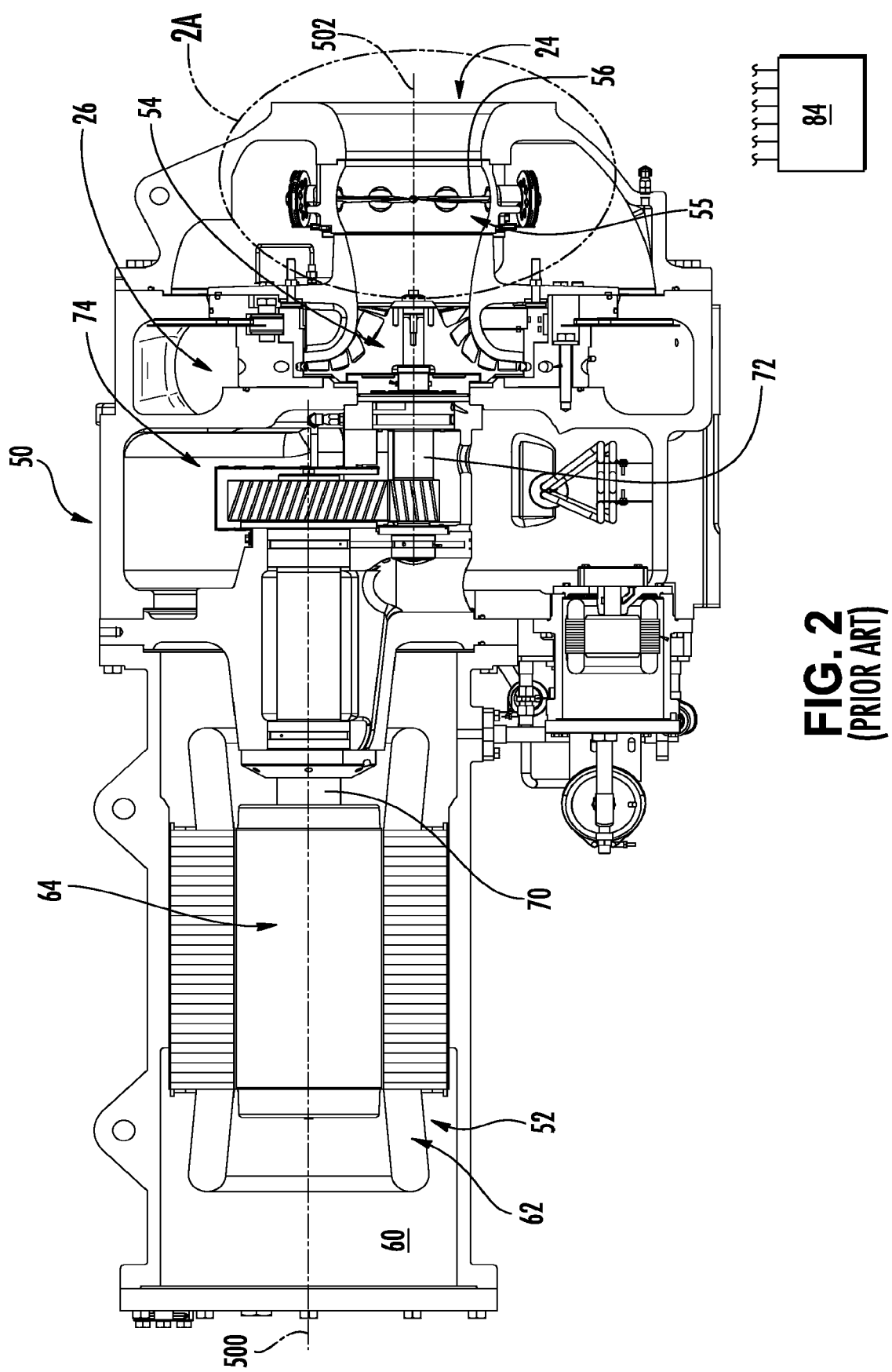
FIG. 2 is a partially schematic sectional view of a centrifugal compressor in the chiller system of FIG. 1.
Figure 2A:
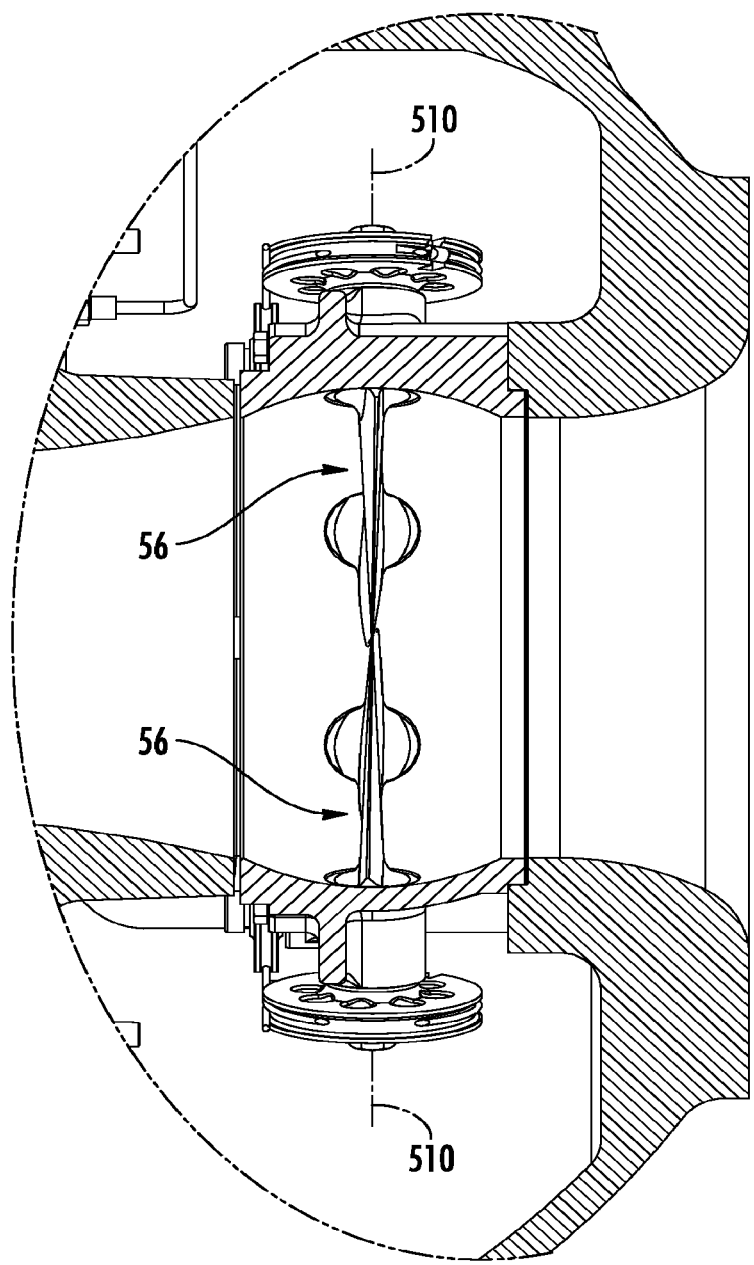
FIG. 2A is an enlarged view of the guide vanes of the compressor of FIG. 2.
Figure 8:
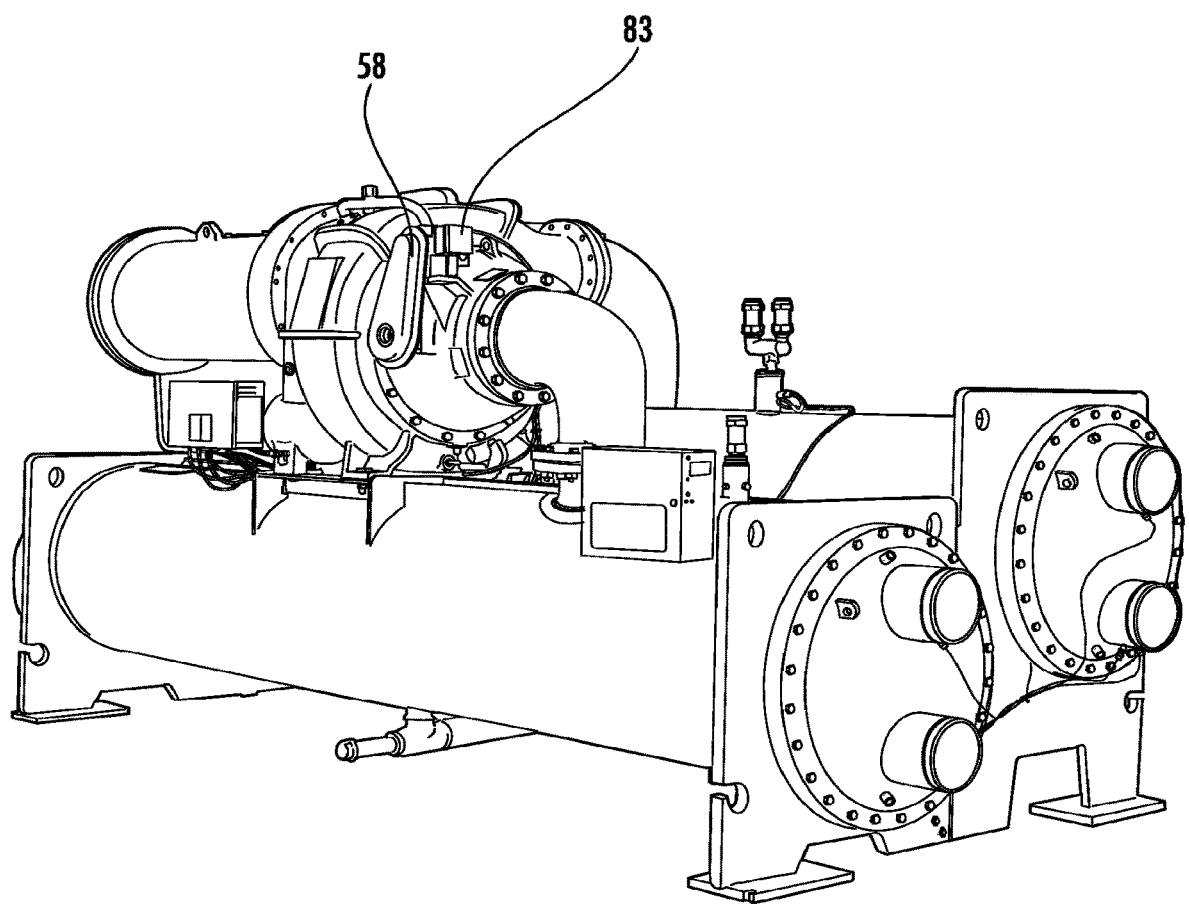
FIG. 8 is a view of the chiller.

FIGS. 1 and 2 further show a sensor 80 and a sensor 82 for sensing various system conditions. The exemplary sensor 80 is a condenser pressure transducer and the exemplary sensor 82 is a cooler pressure transducer. These may respectively be used to measure condenser saturation pressure and cooler saturation pressure. FIG. 8 also shows a guide vane position sensor 83 (schematically via its housing). These sensors may be coupled to a controller 84 which also controls the motor, the powering of the bearings, and other compressor and system component functions. The controller may use the inputs of sensors 80 and 82 to respectively calculate condenser saturation temperature and cooler saturation temperature. The controller may receive user inputs from one or more input devices (e.g., switches, keyboard, or the like) and additional sensors (not shown). The controller may be coupled to the controllable system components (e.g., valves, the bearings, the compressor motor, vane actuators, and the like) via control lines (e.g., hardwired or wireless communication paths). The controller may include one or more: processors; memory and/or storage (e.g., for storing program information for execution by the processor to perform the operational methods and for storing data used or generated by the program(s)); and hardware interface devices (e.g., ports) for interfacing with input/output devices and controllable system components.

As so far described, the system and compressor may be representative of any of numerous system and compressor configurations. The sensors 80 and 82 may be existing sensors used for control of system operation. In an exemplary modification from a baseline such system and compressor, the control routines of the controller 84 may be augmented with an additional routine (subroutine) or module which uses the outputs of one or both of the sensors 80 and 82 to control the compressor and/or system components to avoid or startup surge. The hardware may otherwise be preserved relative to the baseline. In a most basic implementation, the program change (e.g., adding the additional subroutine) is made in a reprogramming or reflash of an existing controller of an existing compressor and/or chiller system so as to remanufacture such compressor and/or chiller system. This may be the only change made or may be made as part of a more comprehensive remanufacturing process. Alternatively, this may be implemented in new equipment (e.g., anywhere from a running change in a manufacture process of compressors and/or chillers to part of a clean sheet design of a compressor and/or chiller).

As alluded to above, the baseline system may be characterized by one of several approaches to startup. One baseline approach to startup involves simply starting up at the last vane condition and responsively compensating for any surge actually encountered. Another possible baseline involves fully closing the vanes prior to motor startup. Whereas the first baseline has disadvantages of encountering surge, the second baseline has disadvantages of extending the startup time. Most of these problems may be reduced or eliminated by a startup procedure that, responsive to a sensed lift condition, only partially closes the vanes (e.g., yet sufficient to avoid surge).

Figure 9:
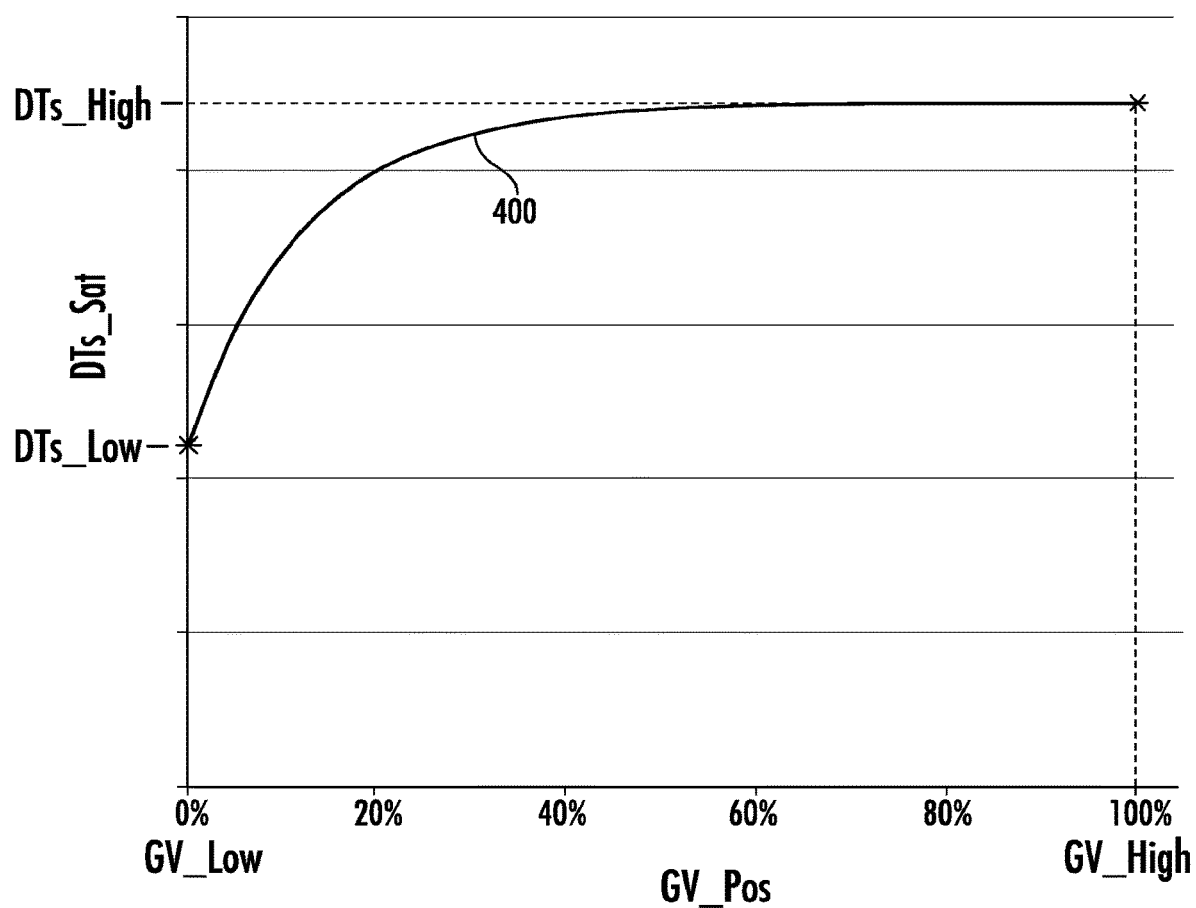
FIG. 9 is a plot of a surge line for the compressor of FIG. 2 plotting lift factor against guide vane position/condition.

Every compressor has a unique surge line, which determines the operating area where the compressor can operate without surging. The surge line extends from a low guide vane position GV_Low to a high guide vane position GV_High. FIG. 9 further shows a lift DTs_High at GV_High and a lift DTs_Low at GV_Low.

FIG. 9 shows a plot of a surge line 400. The guide vane position is shown on the X-axis. In an idealized system, 0 represents a vane chord normal to the inlet axis and axis of the array and 100 represents a vane chord parallel to such axis. Due to physical constraints of the interleaving, 0 may represent an orientation off 0° and 100 may represent an orientation of less than 90° relative thereto. Alternative scales may be used where GV_Low and/or GV_High depart from 0 and 100. The Y-axis represents the lift defined as $\Delta T$-sat or DT_sat or DT_s which is the saturation temperature of the condenser minus the saturation temperature of the cooler or evaporator.

Each surge line is characterized by five parameters: GV_Low=guide vane angular position when the guide vane is closed (e.g., 0%); DTs_Low=maximum allowable lift at 100% speed at GV_Low without causing surge; GV_High=guide vane angular position when the guide vane is fully open (i.e., 100%); DTs_High=maximum allowable lift at 100% speed at GV_High without causing surge; and Shapefac=a constant, dependent upon the compressor aerodynamics; $-1 < x < 0$. Exemplary Shapefac is $-1$ to 0, more narrowly, $-0.2$ to $-0.04$ or $-0.08$ to $-0.04$. Exemplary DTs_Low is 5-15 C. Exemplary DTs_High is 20-30 C.

Figure 10:
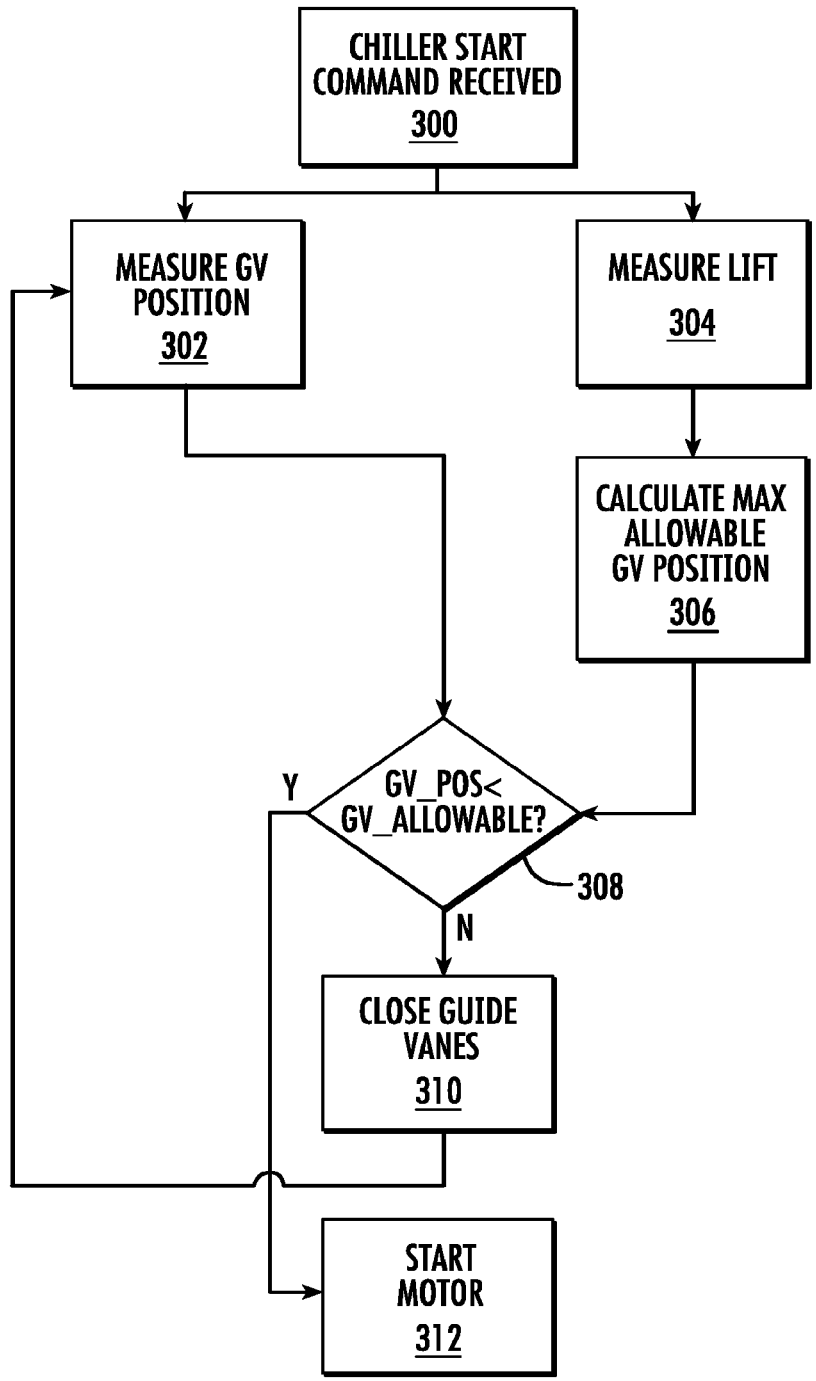
FIG. 10 is an operational flowchart of a startup subroutine of the compressor of FIG. 2.

The surge line 400 is characterized by following equation system:

$DT\_sat$ at $GV\_Pos = A + B*e^C$ $A = DTs\_Low - B$ $B = (DTs\_High - DTs\_Low)/(e^D - 1)$ $C = (Shapefac*(GV\_Pos - GV\_Low))$ $D = (Shapefac*(GV\_High - GV\_Low))$ FIG. 10 shows an exemplary startup control algorithm which, as noted above, may be superimposed on a baseline control algorithm. At block 300, the chiller start command is received (e.g., after a shutdown which may have been an uncommanded shutdown leaving vanes in a prior operating condition). Thereafter, guide vane position is measured (302) via the sensor 83 and lift across the cooler and evaporator is measured 304. Based upon the measured lift, the maximum allowable guide vane position (maximum degree of openness) is calculated 306. At block/step 304, the lift or DT_sal can be measured using the formula: DT_sal=saturation temperature of condenser—saturation temperature of evaporator. The saturation temperature of condenser is the saturation temperature of refrigerant at condenser pressure as measured by sensor 80; the saturation temperature of cooler is the saturation temperature of refrigerant at cooler pressure as measured by sensor 82. In block/step 306 that DT_sat can be plugged in the above equation system and a GF_Pos may be calculated using iterative methods. The GV_Pos calculated from above equation is the maximum allowable guide vane position (GV_Allowable).

It is then determined 308 whether the measured guide vane position (condition) is less open than the maximum allowable guide vane condition. If no, then the guide vanes are closed 310. In the example, this may be a continuous closing with the system repeatedly remeasuring guide vane position at step 302 and comparing it at step 308 until it is within the allowable range. Alternative variations may create incremental variants or variants where the system closes the vanes directly to the target condition. Once the guide vane position is within the allowable range (a "yes" result at step 308) the motor is started 312 and accelerated up to its one hundred percent operating speed which is one hundred percent of a desired motor speed as per design of the compressor.

In one shutdown example, the compressor is initially running and has following characteristics: Shapefac=−0.08; GV_Low=0%; DTs_Low=11.1° C.; GV_High=100%; and DTs_High=22.2 C. Values from the surge line are shown in Table I:

chiller is no longer able to absorb heat from the evaporator liquid. On the other hand, because the chiller is no longer rejecting heat to the condenser, the saturation temperature of the condenser starts to decrease. When power comes back, the exemplary cooler and condenser saturation temperature became 8.9 C and 27.8 C. Therefore, when power came back, the lift across the compressor was 27.8 C−8.9 C=18.9 C. From the above table, the maximum allowable guide vane position is 15%. Where a baseline system would wait until the guide vanes close down to 0%. Therefore, the new algorithm offers an improvement over the baseline by saving the time needed to go from 15% to zero.

In a second example, the chiller was operating at 100% speed and 30% guide vane opening. Exemplary saturation temperatures of cooler and condenser were 8.9 C and 30 C respectively. Therefore the lift (DT_sat) was 21.1 C. Therefore, the chiller was operating at the surge line. The power is lost and chiller stops rotating. However, the guide vanes are stuck at 30% because power to the guide vane actuator is lost. When power came back, the exemplary cooler and condenser saturation temperature became 11.1 C and 23.9 C. Therefore, when power came back, the lift across the compressor was 12.8 C. From the above chart, the maximum allowable guide vane position is 9%.

In a third example, the chiller was operating at 100% speed and 10% guide vane opening. Exemplary saturation temperatures of cooler and condenser were 10 C and 25.6 C respectively. Therefore, the lift (DT_sat) was 15.6 C. Therefore, the chiller was operating well below the surge line because maximum allowable lift is 17.2 C. The power is lost and chiller stops rotating. However, the guide vanes are stuck at 30% because power to the guide vane actuator is lost. When power comes back, the exemplary cooler and condenser saturation temperature became 12.2 C and 23.3 C. Therefore, when power came back, the lift across the compressor was 11.1 C. From the above chart, the maximum allowable guide vane position is 0%. Therefore, the new algorithm does not offer an improvement over the baseline.

Although an embodiment is described above in detail, such description is not intended for limiting the scope of the present disclosure. It will be understood that various modifications may be made without departing from the spirit and scope of the disclosure. For example, when applied to the reengineering of an existing system, details of the existing system or its use may influence details of any particular implementation. As noted above, in a minimal change situation, this may be achieved by merely reprogramming the controller to perform the method (e.g., adding the steps

TABLE I

| GV_Pos (%) | 0 | 5 | 10 | 15 | 20 | 25 | 30 | 35 | 40 | 50 | 60 | 70 | 80 | 90 | 100 |
|---|---|---|---|---|---|---|---|---|---|---|---|---|---|---|---|
| Maximum allowable lift (DTsat (C.)) | 11.1 | 15.0 | 17.2 | 18.9 | 20.0 | 20.6 | 21.1 | 21.7 | 22.2 | 22.2 | 22.2 | 22.2 | 22.2 | 22.2 | 22.2 |

The chiller was operating at 100% speed and 100% guide vane opening. Exemplary saturation temperatures of cooler and condenser were 6.7 C and 28.9 C respectively. Therefore the lift (DTsat) was 22.2 C. Therefore the chiller was operating at the surge line. The power is lost and chiller stops rotating. However, the guide vanes are stuck at 100% because power to the guide vane (GV) actuator is lost. On the other hand, when the compressor is not running, the saturation temperature of the cooler starts rising because the 306 and 308 to a basic startup algorithm). Accordingly, other embodiments are within the scope of the following claims.

What is claimed is:

1. A method for controlling a centrifugal compressor having an inlet, an outlet, an impeller mounted for rotation about an impeller axis, a motor coupled to the impeller to drive the impeller about the impeller axis, and a variable inlet guide vane array controllable for movement between a relatively closed first condition and a relatively open second condition, the method comprising:
- determining a saturation temperature difference between a heat rejection heat exchanger and a heat absorption heat exchanger;
- determining an allowable guide vane condition based upon said saturation temperature difference;
- closing the variable inlet guide vane array to said determined allowable guide vane condition; and
- accelerating the impeller from a dead stop to an operational speed.

2. The method of claim 1 performed as a restart after an uncommanded shutdown.

3. The method of claim 1 wherein the determining of the allowable guide vane condition comprises an iterative calculation.

4. The method of claim 3 wherein the iterative calculation uses the equations:

$$DT\_sat \text{ at } GV\_Pos = A + B*e\char`\^C$$

$$A = DTs\_Low - B$$

$$B = (DTs\_High - DTs\_Low)/(e\char`\^D - 1)$$

$$C = (Shapefac*(GV\_Pos - GV\_Low))$$

$$D = (Shapefac*(GV\_High - GV\_Low)),$$

wherein:
- GV_Low=guide vane angular position when the guide vane is closed;
- DTs_Low=maximum allowable lift at 100% speed at GV_Low without causing surge;
- GV_High=guide vane angular position when the guide vane is fully open;
- DTs_High=maximum allowable lift at 100% speed at GV_high without causing surge; and
- Shapefac=a constant, dependent upon the compressor aerodynamics.

5. The method of claim 1 wherein said closing of the variable inlet guide vane array to said determined allowable condition is part of an iterative process comprising:
- measuring a guide vane condition;
- comparing the measured guide vane condition to the determined allowable guide vane condition; and
- if said measured guide vane condition is more open than said determined allowable condition, closing the variable inlet guide vane array.

6. The method of claim 5 wherein:
the closing comprises:
an incremental closing.

7. A controller configured to implement the method of claim 1.

8. The controller of claim 7 configured to determine the allowable guide vane condition via an iterative calculation wherein:

$$DT\_sat \text{ at } GV\_Pos = A + B*e\char`\^C$$

$$A = DTs\_Low - B$$

$$B = (DTs\_High - DTs\_Low)/(e\char`\^D - 1)$$

$$C = (Shapefac*(GV\_Pos - GV\_Low))$$

$$D = (Shapefac*(GV\_High - GV\_Low)),$$

wherein:
- GV_Low=guide vane angular position when the guide vane is closed;
- DTs_Low=maximum allowable lift at 100% speed at GV_Low without causing surge;
- GV_High=guide vane angular position when the guide vane is fully open;
- DTs_High=maximum allowable lift at 100% speed at GV_High without causing surge; and
- Shapefac=a constant, dependent upon the compressor aerodynamics.

9. The controller of claim 8 wherein:

$$GV\_Low = 0\%;$$

$$DTs\_Low = 5° C. \text{ to } 15° C.;$$

$$GV\_High = 100\%;$$

$$DTs\_High = 20° C. \text{ to } 30° C.; \text{ and}$$

$$Shapefac = -1 \text{ to } 0.$$

10. A chiller system comprising:
- the controller of claim 7;
- said centrifugal compressor;
- said heat rejection heat exchanger downstream of the centrifugal compressor along a refrigerant flowpath; and
- said heat absorption heat exchanger downstream of the heat rejection heat exchanger along the refrigerant flowpath.

11. A method for reprogramming a controller to become the controller of claim 7, the method comprising:
- adding instructions for said determining said allowable guide vane condition and said closing the variable inlet guide vane array to said determined allowable guide vane condition.

12. The method of claim 1 wherein:
the closing is while the compressor is at the dead stop.

13. The method of claim 1 wherein:
the allowable guide vane condition is a condition for avoiding surge.

14. The method of claim 1 wherein:
- GV_Low=guide vane angular position when the guide vane is closed;
- GV_High=guide vane angular position when the guide vane is fully open; and
- the allowable guide vane condition is greater than GV_Low and less than GV_high.

15. The method of claim 14 wherein:
the closing is while the compressor is at the dead stop.

16. A method for controlling a centrifugal compressor having an inlet, an outlet, an impeller mounted for rotation about an impeller axis, a motor coupled to the impeller to drive the impeller about the impeller axis, and a variable inlet guide vane array controllable for movement between a relatively closed first condition and a relatively open second condition, the method comprising:
- after an uncommanded shutdown, determining a lift value;
- determining an allowable guide vane condition based upon said lift value;
- closing the variable inlet guide vane array to said determined allowable guide vane condition; and
- accelerating the impeller to an operational speed.

17. The method of claim 16 wherein said closing of the variable inlet guide vane array to said determined allowable condition is part of an iterative process comprising:

measuring a guide vane condition;
comparing the measured guide vane condition to the determined allowable guide vane condition; and
if said measured guide vane condition is more open than said determined allowable condition, closing the variable inlet guide vane array.

18. A method for controlling a centrifugal compressor having an inlet, an outlet, an impeller mounted for rotation about an impeller axis, a motor coupled to the impeller to drive the impeller about the impeller axis, and a variable inlet guide vane array controllable for movement between a relatively closed first condition and a relatively open second condition, the method comprising:
determining a lift value;
determining an allowable guide vane condition based upon said lift value, and comprising an iterative calculation;
closing the variable inlet guide vane array to said determined allowable guide vane condition; and
accelerating the impeller to an operational speed,
wherein the iterative calculation uses the equations:

$$DT\_sat \text{ at } GV\_Pos = A + B * e^C$$

$$A = DTs\_Low - B$$

$$B = (DTs\_High - DTs\_Low)/(e^D - 1)$$

$$C = (Shapefac * (GV\_Pos - GV\_Low))$$

$$D = (Shapefac * (GV\_High - GV\_Low)),$$

wherein:
GV_Low=guide vane angular position when the guide vane is closed;
DTs_Low=maximum allowable lift at 100% speed at GV_Low without causing surge;
GV_High=guide vane angular position when the guide vane is fully open;
DTs_High=maximum allowable lift at 100% speed at GV_High without causing surge; and
Shapefac=a constant, dependent upon the compressor aerodynamics.

19. The method of claim 18 wherein said closing of the variable inlet guide vane array to said determined allowable condition is part of an iterative process comprising:
measuring the guide vane condition;
comparing the measured guide vane condition to the determined allowable guide vane condition; and
if said measured guide vane condition is more open than said determined allowable condition, closing the variable inlet guide vane array.

20. The method of claim 18 wherein:
the allowable guide vane condition is greater than GV_Low and less than GV_high.

* * * * *